United States Patent [19]

Nyman et al.

[11] 3,982,066

[45] Sept. 21, 1976

[54] METAL COATING FOR VIDEO DISCS
[75] Inventors: Frederick Russell Nyman, Carmel, Ind.; John Louis Vossen, Jr., Bridgewater; Dennis Glendon Fisher, Titusville, both of N.J.; George Frederick Nichols, Oaklandon, Ind.
[73] Assignee: RCA Corporation, New York, N.Y.
[22] Filed: July 25, 1975
[21] Appl. No.: 599,128

[52] U.S. Cl. .............................. 178/6.6 R; 29/195; 29/199; 178/6.6 A; 179/100.1 B
[51] Int. Cl.² ......................................... B32B 15/08
[58] Field of Search ............. 29/195 P, 199; 75/171; 178/6.6 R, 6.6 A; 179/100.1 B

[56] References Cited
UNITED STATES PATENTS

| | | | |
|---|---|---|---|
| 3,558,290 | 1/1971 | Baier et al. ........................... | 29/195 |
| 3,842,194 | 10/1974 | Clemens ........................... | 178/6.6 A |
| 3,842,217 | 10/1974 | Clemens........................... | 179/100.1 B |
| 3,843,399 | 10/1974 | Kaplan et al...................... | 178/6.6 R |
| 3,901,994 | 8/1975 | Mehalso et al............... | 179/100.1 B |
| 3,909,517 | 9/1975 | Clemens ....:....................... | 178/6.6 A |

*Primary Examiner*—L. Dewayne Rutledge
*Assistant Examiner*—E. L. Weise
*Attorney, Agent, or Firm*—Glenn H. Bruestle; Birgit E. Morris

[57] ABSTRACT

An improved metal coating for a video disc of a grooved polymer disc, a conductive metal coating thereon and a dielectric coating on said metal coating comprising a trilayer film of a first layer of copper about 25–50 angstroms thick, a second layer about 200 angstroms thick of an alloy of nickel, and chromium and, optionally, iron, containing from about 20 to about 30 atomic percent of oxygen, and a third layer, of copper, about 25–50 angstroms thick.

8 Claims, 2 Drawing Figures

METAL COATING FOR VIDEO DISCS

REFERENCE TO RELATED APPLICATIONS

This application is an extension of the subject matter described in application of Vossen et al, "Improvement in Adherence of Metal Films to Polymeric Materials" Ser. No. 599,130 filed concurrently herewith, and an alternate to the subject matter in application of Vossen et al, "Improved Metal Coating for Video Discs" Ser. No. 559,129 filed concurrently herewith.

This invention relates to novel, conductive, corrosion-resistant metal films on an insulating substrate. More particularly, this invention relates to a thin, conformal, conductive, corrosion-resistant metal film which has improved adherence to polymeric materials.

BACKGROUND OF THE INVENTION

A novel video recording and playback system has been described by Clemens in U.S. Pat. No. 3,842,194 and 3,842,217. According to this system, video, audio and color information is recorded in the form of geometric variations in a spiral groove on a surface of a disc. Disc replicas, made of an insulating material, such as vinyl, are coated first with a thin, conformal, conductive metal layer as a first electrode of a capacitor, and then with a thin, conformal, dielectric layer. A metal-tipped stylus acts as a second electrode of the capacitor. The stylus monitors changes in capacitance between the stylus and the metal film on the disc as these geometric variations pass beneath the stylus upon rotation of the grooved disc to effect recovery of signals occupying a band width of at least several megahertz which are converted back to video, audio and color information suitable for display by a television monitor.

Several metals have been suggested for use as the thin, conductive metal layer. Aluminum was first tried because it is inexpensive, but it was found to be unsatisfactory because it became grainy on storage, leading to high noise levels on playback. Gold was tried and was found to have excellent properties, and is particularly corrosion-resistant, but is too expensive to use on a large commercial scale. Further, adherence of the dielectric film, particularly glow discharge polymerized styrene, as disclosed in U.S. Pat. No. 3,843,399, to the gold surface leaves something to be desired and results in undue wear of the record during playback. Copper was also tried. This metal in thin layers has excellent adherence to polymeric substrates, particularly vinyl compounds, but is not satisfactory because it corrodes rapidly in the atmosphere on storage. Conductive metal alloys of nickel and copper, which are corrosion resistant, have also been tried, but their poor adhesion to organic materials makes them unsuitable for use on the video disc. Thus the search for a thin, conductive, adherent, corrosion-resistant metal coating for the video disc has continued.

SUMMARY OF THE INVENTION

We have discovered that a trilayer metal film comprising a first thin copper layer; a second layer of a metal or alloy which is corrosion resistant, conductive and can form a low stress film, particularly alloys of nickel and chromium and, optionally, iron, containing less than 10 percent by weight of iron, and containing particular amounts, from about 20 to about 30 atomic percent, of oxygen; and a third layer of copper; is highly adherent to organic materials, is non-corrosive and conductive. The metals are applied to an organic substrate by planar magnetron sputtering in an atmosphere containing an inert gas with small amounts of air or oxygen.

DETAILED DESCRIPTION OF THE INVENTION

Figure 1:
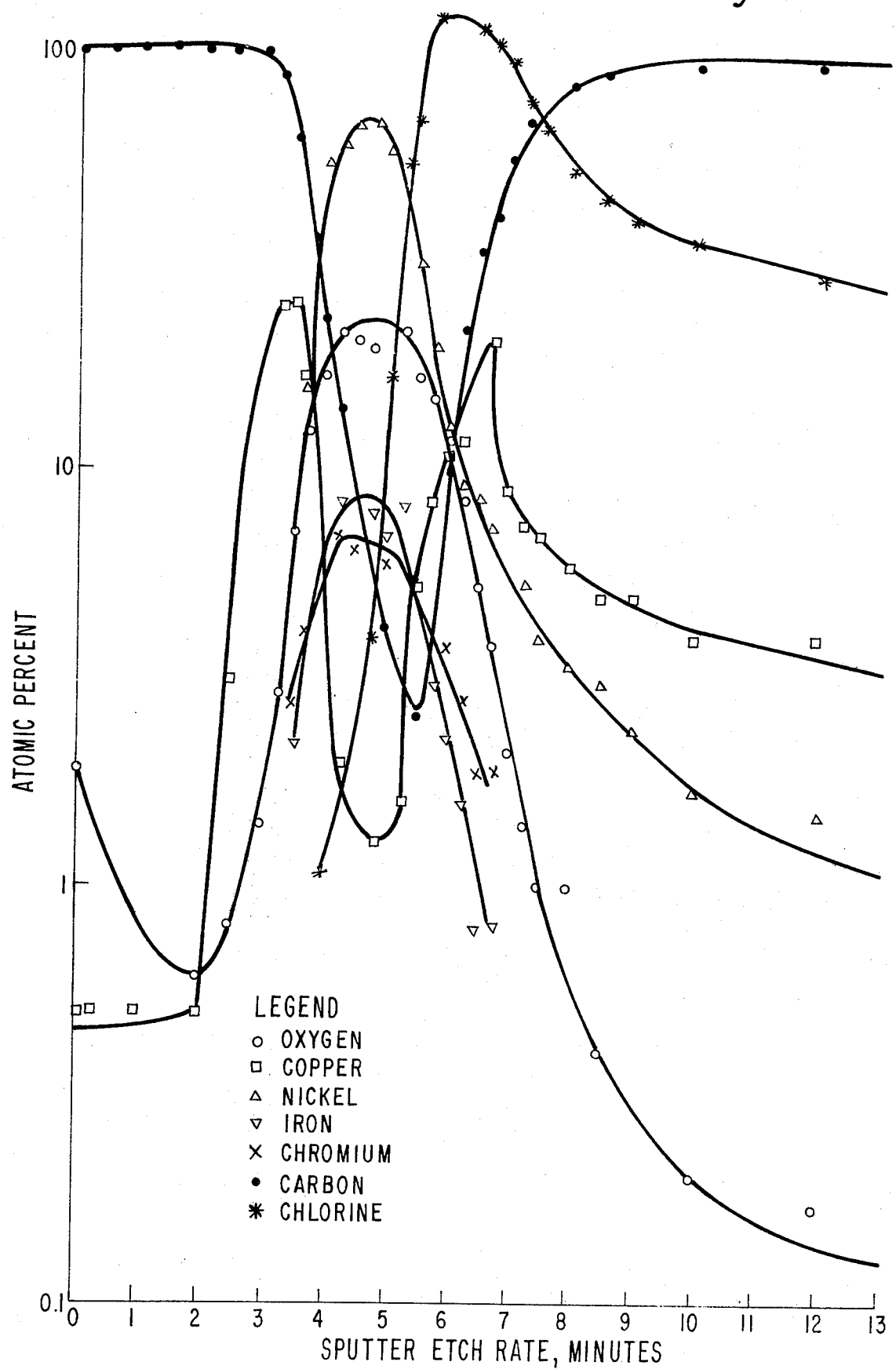
FIG. 1 is a graph of the atomic percent of the elements in a film of the invention as a function of sputter etch depth.

The present metal layer and process for making it will be described particularly with reference to a video disc as described by Clemens and referred to above, but it will be readily understood that the invention has applicability to organic substrates other than a vinyl, grooved disc. Further, the metal layer can be coated with other materials, such as a dielectric or other non-conductive layer, organic or inorganic, or sandwiched between two organic layers for other applications.

The nickel-chromium-iron alloys useful herein contain from about 65 to about 80 weight percent of nickel, about 10 to about 30 weight percent of chromium and from 0 to about 10 weight percent of iron.

According to one method of preparing the present films, the organic substrate to be coated with a conductive, corrosion-resistant metal film is placed in a vacuum chamber and connected to a positive source of current, such as a planar magnetron source. The vacuum chamber is also fitted with negative electrodes of the copper and of the nickel-chromium-iron alloy to be sputtered. The chamber is then evacuated to a pressure of about $5 \times 10^{-6}$ to $3 \times 10^{-5}$ torr and a small amount of an inert gas, such as argon, is fed into the chamber to a pressure of up to about 100 millitorr. An amount of oxygen is required in the system that will produce about 20 to 30 atomic percent of oxygen in the metal layer. Oxygen is present as a contaminant in the inert gas and in the residual atmosphere in the vacuum chamber in generally sufficient amounts, but a predetermined amount of oxygen can be deliberately added for more precise control.

When a planar magnetron is employed in the chamber as the source of current, the voltage can be varied from about 300–1000 volts and current can be up to about 10 amperes depending upon the rate of deposition desired and the size of the electrode.

The copper source is activated first to initiate sputtering on the substrate and is continued until a thin layer of about 25 to 50 angstroms of copper is deposited. The current to the copper electrode is then discontinued and the nickel-chromium-iron alloy electrode is activated so as to sputter a layer of alloy about 200 to 400 angstroms thick over the copper layer. That electrode is then inactivated and a final thin layer of copper, also about 25 to 50 angstroms thick, is sputtered in similar fashion onto the alloy layer.

The copper films have excellent adhesion to vinyl substrates, such as the molded, grooved video discs, and they also adhere well to the nickel-chromium-iron alloy layer and to organic coatings. Thus the purpose of the copper layers is to provide good adhesion of the conductive metal layer both to the vinyl substrate and to a polymeric dielectric layer subsequently applied. However, unexpectedly, sufficient diffusion of the copper layer and the alloy layer occurs during deposition, so that the thin copper layer is not subject to extensive corrosion problems provided the total oxygen content of the alloy layer is at least 20 atomic percent. However, a maximum of about 30 atomic weight of oxygen in the alloy layer can be tolerated when highly conductive films are required.

The atomic percent of oxygen as employed in the specification and claims is defined as that measured by Auger electron spectroscopy. The absolute value of the oxygen content, $\gamma(0)$, is determined by the following calibration: a pure silver sample is sputter etched removing about 300 angstroms and the Auger peak to peak magnitude for the Ag doublet (351:354 ev) is recorded. This value is taken to be $\Delta(Ag)$. The peak to peak magnitude for the 0 (510 ) Auger peak in the sample to be measured is taken to be $\Delta(0)$. The absolute 0 value is calculated according to the equation $$\gamma(O) = \frac{\Delta(O)}{\Delta(Ag)} \times 1.03$$

The 1.03 factor for Ag is obtained from the Handbook of Auger Electron Spectroscopy, Palmberg et al.

FIG. 1 shows an Auger spectroscopy profile of a vinyl disc coated with about 25 angstroms of copper, then about 200 angstroms of Inconel-600 alloy, then about 25 angstroms of copper and finally with about 350 angstroms of a polymer of styrene, which graphs the atomic percent of the elements present as a function of the sputter etch rate in minutes. As the surface of the styrene coated disc is sputter etched away, the various coatings and layers are revealed.

A careful study of the resultant profile for oxygen shows that the oxygen content in the styrene layer decreases adjacent to the copper layer, is less than about one atomic percent in the second copper layer and increases markedly in the Inconel-600 layer, and again rapidly decreases in the first copper layer, until only a trace remains in the substrate. Thus it would appear that the copper remains unoxidized, whereas the Inconel-600 appears to absorb most of the oxygen present in the system.

The exact mechanism of the combination of improved adhesion and corrosion resistance of the present metal films is unknown, but it is presently believed that the copper serves to stress relieve the nickel-chromium-iron alloy film. As determined by electron spectroscopy for chemical analysis, no chemical bonding between the metal layers and/or the organic substrate or coating is involved.

The invention will be described further in the following examples but it is to be understood that the invention is not to be limited to the details described therein. In the examples, all parts and percentages are by weight unless otherwise noted.

EXAMPLE 1

A vacuum chamber was fitted with two planar magnetron sputtering cathodes, one made of copper and the other of Inconel-600, an alloy containing 76.8% of nickel, 13.8% of chromium, both ± 3%, and 8.5 ± 2% of iron (plus minor amounts of impurities). Both cathodes were 8.25 × 3.56 inches (20.96 × 9.04 cm) in size. A video disc twelve inches (30.48 cm) in diameter was suspended about two inches (5.08 cm) above the electrodes and rotated at 40 rpm.

The chamber was evacuated to a pressure of $3 \times 10^{-5}$ torr and backfilled through a valve to a pressure of about 15 millitorr with argon.

The copper electrode was activated with 360 volts, 0.3 amperes of current. The average deposition rate on the record under these conditions was about 80 - 100 angstroms per minute. Copper deposition was continued for about 30 seconds or until a layer about 50 angstroms thick of copper had been deposited, when this electrode was inactivated.

The Inconel-600 electrode was then activated with 650 volts 1.5 amperes of current, resulting in a deposition rate of about 330 - 400 angstroms per minute. Deposition was continued for about 30 seconds or until a layer about 200 angstroms thick had been deposited, when the electrode was inactivated.

The copper electrode was then reactivated to apply another layer of copper about 50 angstroms thick over the Inconel-600 layer.

The metal film was tested for adhesion by storing for 120 hours at 90°F and 90% RH in air and applying scotch tape to the surface. No film was removed when the scotch tape was pulled off.

EXAMPLE 2

A series of films was prepared by sputtering first a 25 angstrom thick layer of copper, then a layer about 200 angstroms thick of Inconel-600 and a third layer of 25 angstroms of copper onto a grooved vinyl disc following the procedure of Example 1, except that the chamber was initially evacuated to $3 \times 10^{-6}$ torr and backfilled with a mixture of 95% argon-5% clean, dry air, to various pressures to vary the amount of oxygen in the films.

The films were tested by an accelerated corrosion test as follows: a layer of sodium chloride was evaporated onto the metal coated disc and heated to about 45°C. Air and $H_2S$ were bubbled through water and the gas stream passed continuously over the metal surface. The time was noted when a visible sign of corrosion appeared under a microscope, including color change, pitting, etc.

Figure 2:
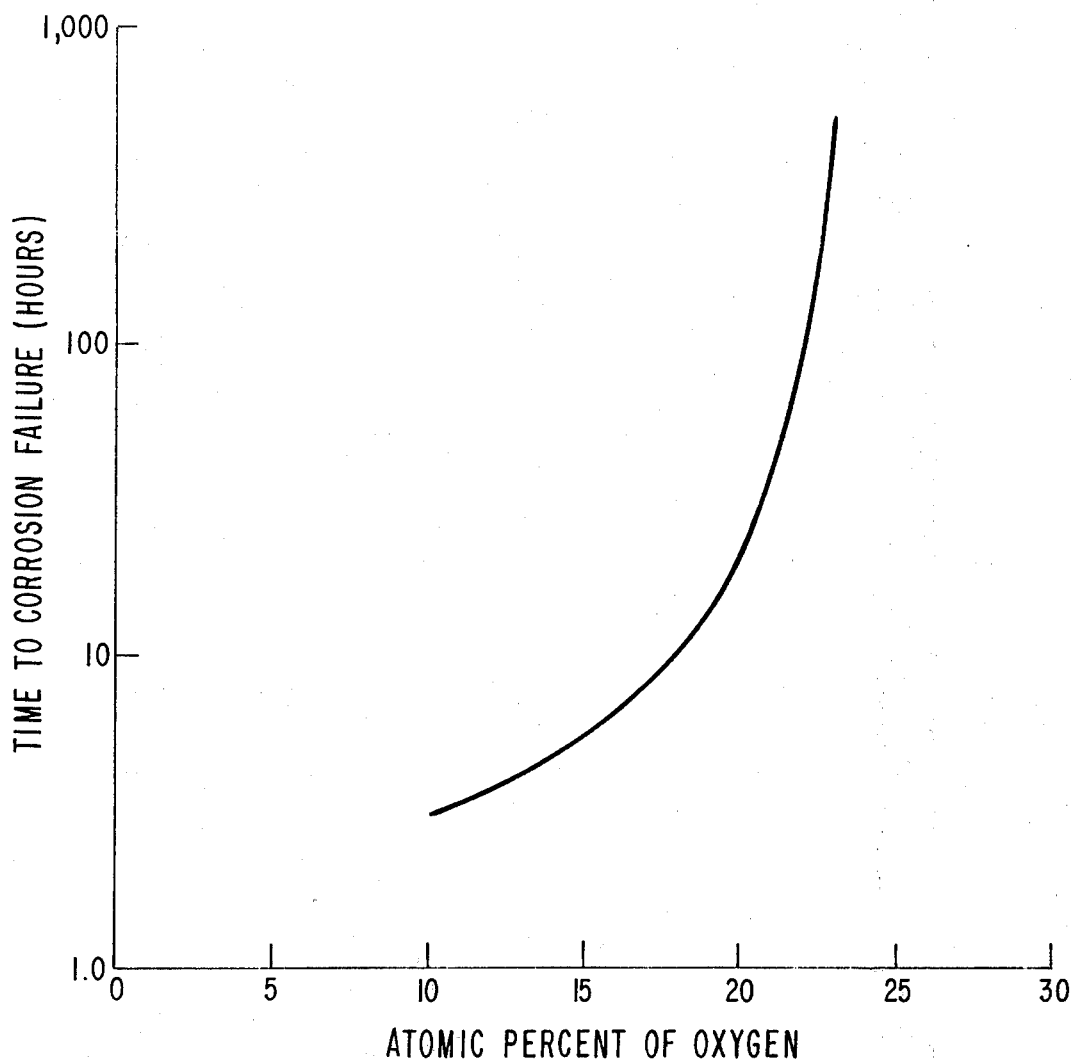
FIG. 2 is a graph of corrosion failure as a function of oxygen content of films of the invention.

FIG. 2 is a graph of the time to corrosion in hours as a function of the atomic percent of oxygen in the film. It is apparent that as the oxygen content increased beyond about 20 atomic percent, the time to corrosion failure increased markedly.

A film of copper alone containing 20 - 23 atomic percent of oxygen pitted severely after about 30 seconds.

Stress measurements were made in known manner by depositing films on very thin aluminum oxide discs, and noting the bending of the disc microscopically. Whereas a film of Inconel-600 about 225 angstroms thick had a compressive stress of $30 \times 10^9$ dynes/cm$^2$, a trilayer coated disc had a compressive stress of only $6 \times 10^9$ dynes/cm$^2$.

Representative metal-coated discs as prepared above were coated with a polymer of styrene as follows: a vacuum chamber fitted as in Example 1 was evacuated to a pressure of about $3 \times 10^{-3}$ torr and backfilled with nitrogen to a pressure of about $8 - 10 \times 10^{-3}$ torr. Styrene monomer was then added to a pressure reading of $13 - 15 \times 10^{-3}$ torr. The metal coated disc was suspended about 2 inches (5.08 cm) above a vertically-mounted, planar magnetron source having a cathode 3.5 × 7 inches (8.9 × 17.8 cm) in size at a power supply frequency of about 10 kilohertz and a voltage of 680 volts. Power was turned on for 30 seconds and the disc lowered to face the electrode and rotated at 40 rpm for two minutes so as to deposit a styrene polymer film about 350 angstroms thick.

Compressive stress for the resultant film was only $4 \times 10^9$ dynes/cm$^2$.

We claim:
1. A thin, conductive, corrosion-resistant trilayer metal film which is adherent to polymeric materials which comprises a first layer of copper from about 25 to 50 angstroms thick, a second layer of an alloy of nickel and chromium which can contain up to 10 percent weight of iron about 200 to about 400 angstroms thick and containing from about 20 to about 30 atomic percent of oxygen and a third layer of copper about 25 to 50 angstroms thick.

2. A metal film according to claim 1 wherein said alloy contains from about 65 to about 80 weight percent of nickel, about 10 to about 30 weight percent of chromium, and from 0 to about 10 weight percent of iron.

3. A metal film according to claim 2 disposed over a polymeric substrate.

4. A metal film according to claim 3 having a polymeric coating disposed thereon.

5. In a capacitive video frequency recording means in the shape of a disc having a spiral groove on a face thereof and video information in the form of geometric variations in said groove, said disc having a thin conductive layer on said face and a thin dielectric layer disposed over the conductive layer, the improvement which comprises employing as the conductive layer a trilayer film having a first layer of copper about 25 to 50 angstroms thick, a second layer of an alloy of nickel and chromium, which contain up to 10 percent by weight of iron about 200 to about 400 angstroms thick and containing from about 20 to about 30 atomic percent of oxygen and a third layer of copper about 25 to 50 angstroms thick.

6. A recording means according to claim 5 wherein said alloy layer contains from about 65 to about 80 percent by weight of nickel, from about 10 to about 30 weight percent of chromium and from 0 to about 10 weight percent of iron.

7. A recording means according to claim 5 wherein said disc is of vinyl.

8. A recording means according to claim 5 wherein said dielectric layer is a polymer of styrene.

* * * * *